United States Patent

Dous et al.

Patent Number: 5,858,404
Date of Patent: Jan. 12, 1999

[54] PROCESS AND APPARATUS FOR PRODUCING TWO-COLORED OR MULTICOLORED FILMS, AND DASHBOARD FILMS OR DASHBOARDS PRODUCED THEREFROM FOR MOTOR VEHICLES

[75] Inventors: Eberhardt Dous, Woerthsee; Uwe Schattauer, Munich, both of Germany

[73] Assignee: Alkor GmbH Kunststoffe, Munich, Germany

[21] Appl. No.: 823,908

[22] Filed: Mar. 25, 1997

Related U.S. Application Data

[62] Division of Ser. No. 704,006, Aug. 22, 1996.

[30] Foreign Application Priority Data

Aug. 22, 1995 [DE] Germany .......... 195 30 757.7

[51] Int. Cl.$^6$ ...................... B32B 9/00
[52] U.S. Cl. ............ 425/461; 425/114; 425/130; 425/257; 425/462; 425/465; 428/207; 428/212; 264/75; 264/176.1; 264/173.11; 264/173.12; 264/173.16; 264/176.21; 156/244.11; 156/244.27; 156/269
[58] Field of Search ................... 428/192, 207, 428/35.7, 35.9, 195, 212; 264/245, 246, 247, 75, 163, 255, 165, 171.15, 171.11; 425/430, 257, 256, 114, 131.1, 130, 190, 462, 133.5, 461; 156/269, 245, 244.27, 244.11

[56] References Cited

U.S. PATENT DOCUMENTS 4,780,345 10/1988 Gray .
4,828,780 5/1989 Luker .................... 264/171
5,262,108 11/1993 Minke et al. ............ 264/163

Primary Examiner—Ellis P. Robinson
Assistant Examiner—Abraham Bahta
Attorney, Agent, or Firm—Foley & Lardner

[57] ABSTRACT

Process and device for producing two-colored or multicolored switchboard films, dashboard films or dashboards for motor vehicles produced therefrom using at least one backing film or backing layer, at least one upper film or upper layer which is arranged thereon and contains dyes and/or color pigments. The polymer melts for these films or layers come from two or more extruders and are supplied first to an adapter or a black box having at least one opening or a gap for the backing film or layer and at least one further opening for the upper film or upper layer. According to the invention, an adapter or a black box is used in which a wedge-shaped projection or a projection of triangular cross section is arranged. At least two different-colored polymer compositions in melt form, having identical viscosity or virtually identical viscosity (difference in MFI at 230° C./2.16 kg of 0 to 0.5 g/10 min), are employed for the upper film or upper layer, and are first of all separated or partially separated by the wedge-shaped projection or projection of triangular cross section in the adapter or in the black box but then, after having passed through the adapter or the black box, are guided alongside one another, the different-colored melts of the upper films combining with the melt layer of the lower film or lower layer prior to exiting the extruder die.

6 Claims, 2 Drawing Sheets

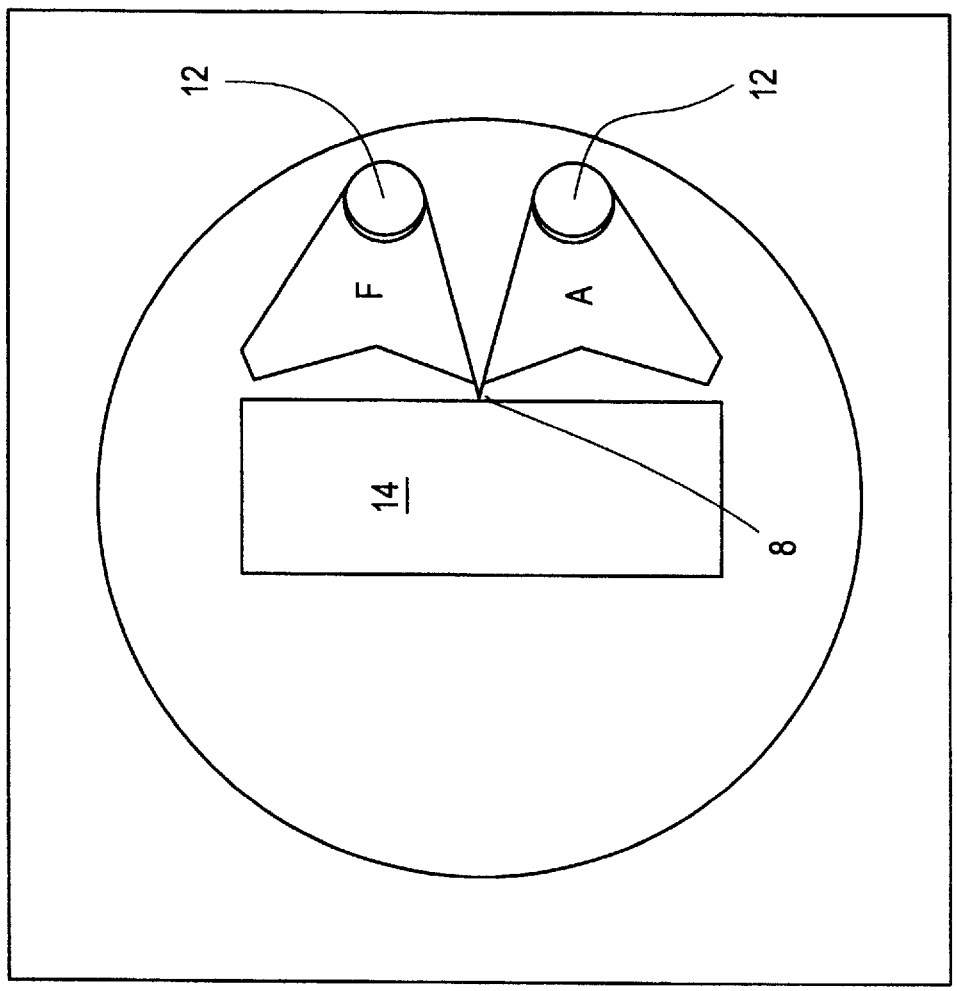

PROCESS AND APPARATUS FOR PRODUCING TWO-COLORED OR MULTICOLORED FILMS, AND DASHBOARD FILMS OR DASHBOARDS PRODUCED THEREFROM FOR MOTOR VEHICLES

This application is a division of application Ser. No. 08/704,006, filed Aug. 22, 1996, pending.

BACKGROUND OF THE INVENTION

The present invention relates to a process and an apparatus for producing two-colored or multicolored switchboard films, dashboard films or dashboards produced therefrom for motor vehicles. The films have at least one backing film or backing layer, at least one upper film or upper layer which is arranged thereon and contains dyes and/or color pigments, and, if desired, further layers or films. The polymer melts for these films or layers come from two or more extruders, and are supplied first to an adapter or a black box having at least one opening or a gap for the backing film or layer and at least one further opening for the upper film or upper layer.

By means of the present invention it is possible to produce switchboard films, dashboard films or dashboards produced therefrom, comprising at least one backing layer or backing film, at least one upper film or upper layer which is arranged thereon and contains dyes and/or color pigments, and, if desired, further layers or films. The upper film or upper layer comprises at least two differently colored or pigmented zones or sections which extend parallel or approximately parallel and which are rectangular or parallelogrammic in plan view, and the different-colored upper film(s) or upper layer(s) are produced as a composite film together with at least one lower film or lower layer by coextrusion or polyextrusion.

EP-A-0 475 004 discloses a process for producing multicolored slush skins (moldings) with different color regions, especially dashboards for motor vehicles and the like. In this process slush material (powder or paste) is introduced into a mold which determines the shape of the slush skin and can be heated to a molding temperature. The slush material is distributed and deposited on the heated mold surface by rotation of the mold, then is sintered and gelled, and finally the slush skin is removed from the mold after the latter has cooled. Corresponding different slush materials for the respective colors are used for the different color areas of the slush skin. In accordance with this process, in the rotational sintering mold the colored polymer is introduced in specific steps and sections of the rotational mold, it being possible to subdivide these by means of fillets, and then the powder trough or powder mold is rotated. This process is limited to the slush process or powder rotational sintering process and cannot be carried out as an extrusion process. Because of necessary restrictions on the polymers, virtually only PVC can be employed.

SUMMARY OF THE INVENTION

One object of the present invention is to provide an improved process and apparatus for producing two-colored or multicolored films suitable for vehicle dashboards. A further object of the invention is to provide two-colored or multicolored switchboard films or dashboard films which can be produced in whole or in part using, inter alia, extruders and for which it is possible to employ not only PVC, but, in particular, thermoplastic and/or thermoelastic synthetic resins.

In accomplishing the foregoing objects, there has been provided according to the present invention, a process for producing two-colored or multicolored films, suitable for producing dashboard components, having at least one backing layer, at least one upper layer which is arranged thereon and contains a dye and/or color pigment. The process comprises:

continuously supplying polymer melt for each layer, from a separate one of two or more extruders to an adapter unit having at least one opening for the backing layer, at least one further opening for the upper layer, and a projection of generally triangular cross section arranged adjacent the further openings;

passing at least two differently-colored polymer compositions in melt form, having at least nearly identical viscosity through the adaptor to make up the upper layer, and first at least partially separating these polymer compositions by the projection of triangular cross section in the adapter; and after passing through the adapter, guiding these polymer compositions contiguously alongside one another in an extruder die along with the melt of the lower layer to form a coextruded film wherein the upper layer is a combination of the differently-colored polymer compositions.

According to another aspect of the present invention there has been provided an apparatus for the production of two-colored or multicolored films, suitable for producing dashboards. The apparatus comprises:

at least two extruders;

at least one adapter having at least three openings for the receiving a supply of polymer melt from a respective extruder or a backing layer, and, downstream of the adapter, an extruder slot die, wherein at least two of the openings made in the adapter are arranged on either side adjacent to a projection of triangular cross section, and at least one further opening is an inlet opening for at least one backing layer and is disposed on the opposite side of the projection from the openings which are arranged on the two sides of the projection.

According to still another aspect of the present invention there has been provided a dashboard film which comprises: at least one backing layer, at least one upper layer which is arranged on the backing layer and contains dyes and/or color pigments, wherein the upper layer comprises at least two zones which extend at least approximately parallel, are rectangular or parallelogrammic in plan view and are pigmented or colored differently, and the differently-colored upper layer zones are produced as a composite film by coextrusion together with at least one lower layer.

Further objects, features and advantages of the present invention will become apparent from the detailed description of preferred embodiments which follows.

BRIEF DESCRIPTION OF THE DRAWINGS

FIG. 2 is a detailed schematic front view of the adapter of the invention.

DETAILED DESCRIPTION OF THE PREFERRED EMBODIMENTS

Figure 1:
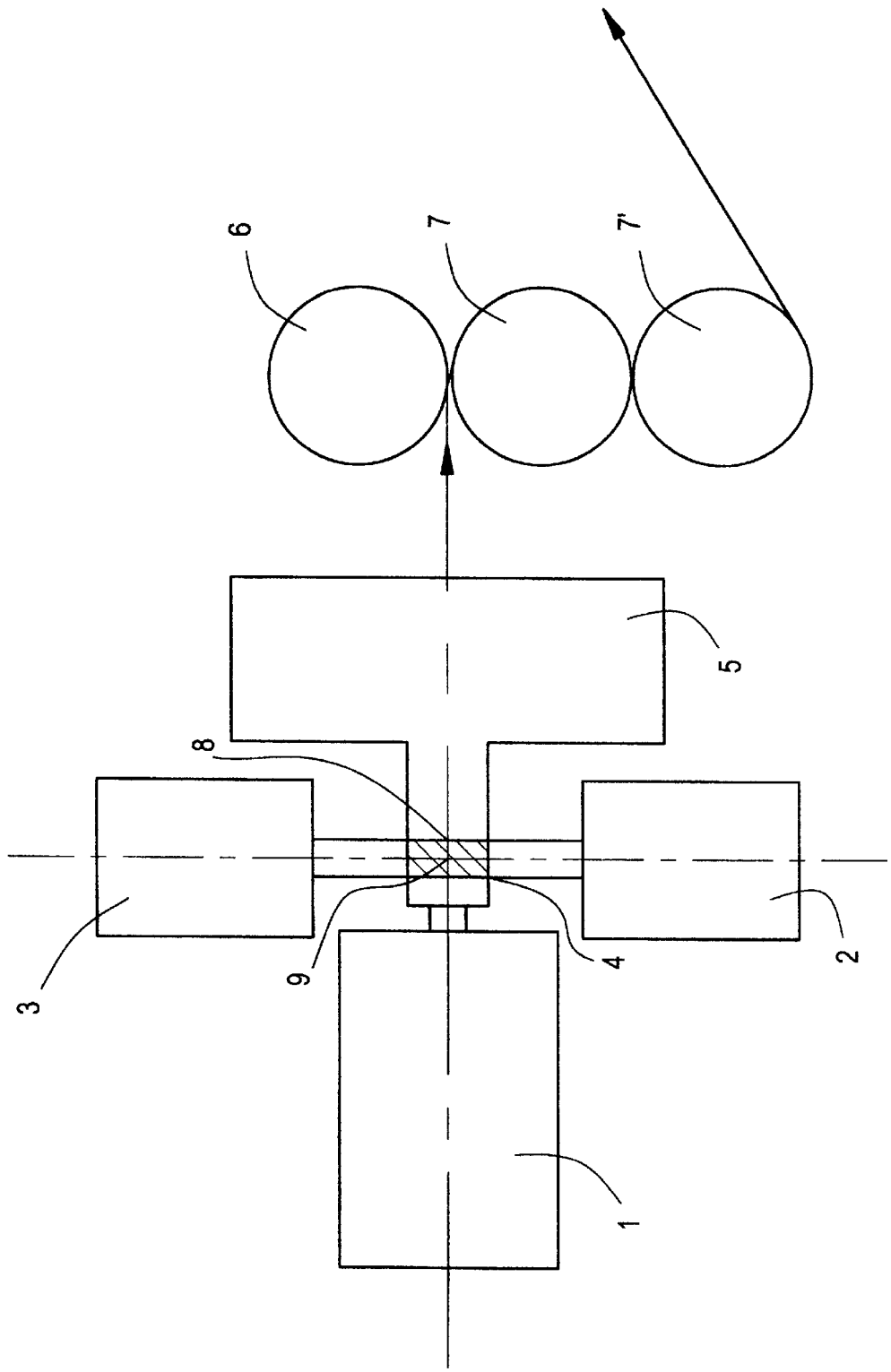
FIG. 1 is a schematic sideview of the apparatus according to the present invention.

In arriving at the present invention, numerous experiments were carried out. For example, a composite film was provided in certain areas with a different-colored coating to give one region with a colored coating and the other region with a different color, i.e., that of the upper film. This embodiment has the disadvantage that the coating protrudes from the film in terms of thickness and, in addition, there is an increased risk of delamination.

In one experiment, fillets were introduced into the extruder slot die. When full-length fillets were produced and different-colored plastics were introduced into the respective fillet areas, flaws were noted at the transition line, i.e., in the region of transition of the colors (regions or lines where the different-colored plastic films or plastic layers meet). When, alternatively, the fillets in shorter form were held within the extruder slot die, disruptive zones of mixed color occurred.

In accordance with the invention it has been found that the above-enumerated objectives are accomplished by a novel process and a device for producing two-colored or multi-colored switchboard films, dashboard films or dashboards produced therefrom using at least one backing film or backing layer, at least one upper film or upper layer which is arranged thereon and contains dyes and/or color pigments. The polymer melts for these films or layers come from two or more extruders and are supplied first to an adapter or a black box having at least one opening or a gap for the backing film or layer and at least one further opening for the upper film or upper layer. According to the invention, an adapter or a black box is used in which a wedge-shaped projection or a projection of triangular cross section is arranged. In this case, at least two different-colored plastics in melt form, having preferably identical viscosity or virtually identical viscosity (difference in MFI at 230° C./2.16 kg of 0 to 0.5 g/10 min) are employed for the upper film or upper layer, and are first of all separated or partially separated by the wedge-shaped projection or projection of triangular cross section in the adapter or in the black box but then, after having passed through the adapter or the black box, are guided alongside one another without the use of a fillet to separate the two melts. The different-colored melts of the upper films combine with the melt layer of the lower film or lower layer prior to exiting the extruder die.

According to a preferred embodiment of the novel process, the melts for the upper film or upper layer, differing in their dye content and/or color pigment content, are led in or guided into the adapter (or the black box) from in each case at least one opening, initially separated by the wedge-shaped projection or projection of triangular cross section in the adapter. The respective openings are disposed on either side adjacent to the projection. Alternately, or in addition, the melt(s) for the lower film(s) is led in or guided in from at least one inlet opening or from a gap which is arranged below or above the opening(s) for the upper layer and below or above the wedge-shaped projection, but in such a way that the tip of the wedge-shaped projection points to the gap or the gaps for the lower film. The melt mass streams of the different-colored surface regions (of the upper film) are in this way combined with the melt mass streams of the lower film(s).

The ready-formed or melt-form film emerging from the extruder slot die is already characterized by a modified appearance as a result of an appropriate selection of the dyes and/or of the concentrations of dye or color pigment and/or by means of different-colored fillers, in such a way that it has in each case a lighter and darker surface region. Alternatively, or additionally, the composite film emerging from the extruder is subsequently subjected to further processing or treatment.

According to another preferred embodiment, the ready-formed or melt-form films emerging from the extruder slot die are divided, by means of the appropriate control of the fed melt streams of the upper film or surface layers, into a relatively wide surface region which is relatively light or is colored with light dyes and/or color pigments (fittings region, region A) and a relatively small surface region (region adjacent to the windshield, region F) which extends parallel or approximately parallel thereto and is relatively dark or is provided with relatively dark dyes and/or color pigments, so that the upper film or surface layer has these different-colored regions.

This embodiment is of importance in asmuchas the increasingly sloping windshields of automobiles (lower drag coefficient) present the danger of light-colored dashboards being reflected in the glass and adversely affecting the driver's sight. On the other hand, light-colored interiors in the car are often required. In order to avoid the reflection in the windshield, but despite this to enable a light-colored interior, the dashboard is divided up in accordance with a preferred embodiment such that one film region (of the upper film or the upper layer) or one half is dark, for example, dark gray, and the other half or the other film region is light, for example, light gray (in the direction of the production sequence). The darker region of the film constitutes what is subsequently the region of the dashboard adjacent the front windshield.

According to a particularly preferred embodiment, the pressure of the individual plastic or extrudate mass streams (measured prior to entry into the adapter), preferably the pressure of the mass streams for the upper film, is kept constant or virtually constant. According to one embodiment, the pressure of the mass streams for the upper film is also preferably constant in the adapter as well.

By means of the form and position of the wedge-shaped projection or projection of triangular cross section and/or of the melt mass streams which enter into the adapter or the black box, which streams are influenced and/or controlled by the capacity of the connected extruder and/or by the inlet opening (or feed lines), the width of the regions A and F for the upper film can be modified.

According to a preferred embodiment, the same synthetic resins are used for the upper film regions or surface layer regions A and F, but different dyes and/or color pigments or different concentrations of dye and/or color pigment are employed. By means of this embodiment it is possible to establish a difference in viscosity of zero or virtually zero for the polymers and for the colored melt mass as well.

According to a preferred embodiment, the tip of the wedge-shaped projection or projection of triangular cross section arranged above the gaps or the opening for the melt of the lower film(s) or lower layer(s) is directed toward the gap or the melt opening for the lower film, the tip being fixed or adjusted relative to the darker-colored region F so that a relatively wide surface layer region A and a relatively small surface region F (dark-colored) are established in the emerging film. The wedge-shaped projection is arranged together with the gaps or openings for the melts on an element, molding or insert, preferably on a disk, and the molding, element or insert is inserted into the adapter or into the black box prior to the production process and is fastened therein or substituted therein. According to a preferred embodiment, the wedge-shaped projection is configured in the manner of a fillet and is arranged in the adapter or on the insert.

The insert component or the insert or the element is constructed such that the two different-colored extrudates (melts) do not contact one another in the black box and can therefore not mix. The mass streams are separated by means of a fillet or the wedge-shaped projection, which according to one embodiment is configured in the manner of a fillet.

According to one embodiment, the coextrudate is extruded onto or laid onto the melt of the backing film which comes from the main extruder. The mass flows to the die without becoming mixed and is distributed uniformly over the width of the die. Preferably, however, the melt of the lower film is arranged above the inherently colored or artificially colored melts of the upper film.

From the die there emerges a melt which possesses at least one backing film or backing layer, carrying, for example, a dark gray and light gray upper film. The proportion in terms of width between light gray and dark gray is determined by the position of the wedge-shaped projection or fillet in the black box, which position is variable.

Owing to the fact that in one embodiment the different-colored melts constitute the same product (formulation), which differs only in terms of coloring, the difference in viscosity which is established according this preferred embodiment is zero or virtually zero.

The hot extrudate webs or melt-form plastic webs produced by the process are subsequently supplied to a polishing-roll stack comprising at least two, preferably at least three polishing rolls. The polishing roll which comes into contact with the two-colored or multicolored plastic extrudate of the upper film is at a heat setting which is more than 30° C., preferably more than 45° C., hotter than that of the polishing roll which comes into contact with the lower film(s).

In this context, polishing rolls or polishing-roll stacks with or without an embossing structure are used. The polishing rolls are cooled or thermostated and are therefore set to the abovementioned temperature ranges. It is preferred to use at least two, preferably at least three, polishing rolls. The polishing rolls are set at different temperatures. According to a preferred embodiment, the lower polishing roll (when two rolls are used), or the middle polishing roll (when three or more rolls are present), which is the roll which comes into contact with the two-colored or multicolored plastic extrudate of the upper film, is set at a heat setting of more than 30° C., preferably more than 45° C., hotter than that of the (upper) polishing roll which comes into contact with the lower film(s). By means of the somewhat hotter setting of the one polishing roll, the colored extrudates of the upper film are not cooled suddenly and combine well with one another, without any loss of the colored contours. Cooling is effected by the roll on the lower film, and the diameter of this roll is kept smaller. The polishing roll on which the surface of the colored upper film (or colored extrudates for the upper film) impinges and on which it lies therefore has a larger diameter than the roll with which the lower film comes into contact. This polishing roll on which the upper film lies also offers the film a longer residence period. Thus, according to a preferred embodiment, the temperature of the upper polishing roll (e.g., polishing roll 6) is from 10° to 28° C., preferably from 18° to 24° C., the temperature of the polishing roll below it (e.g., polishing roll 7) is from 60° to 85° C., preferably from 75° to 82° C., and the temperature of the subsequent polishing roll, (e.g. 7'), is from 15° to 35° C., preferably from 23° to 33° C. According to a preferred embodiment, the temperature of the third and/or further subsequent polishing roll(s) (7' and, if appropriate, following rolls) is set at more than 25° C., preferably more than 35° C., below the temperature of the polishing roll, (i.e., the roll at the inlet) having the largest roll diameter. The temperature of the third (7') roll and/or of one or more subsequent rolls is preferably at least equal to the temperature of the upper polishing rolls (6), but is preferably more than 5° C. more than the temperature of the upper inlet polishing roll (6).

According to one embodiment, the film is subsequently provided with a protective coating. According to still another embodiment, the film is provided with a grain or embossed pattern.

The polymer films produced by the novel process are preferably subjected to a thermoforming operation, given a foam backing and processed further to form dashboards.

According to another preferred embodiment, the polymer compositions of the lower film(s) and/or of the different-colored or two-colored upper film(s) which are to be extruded in accordance with the invention include at least one crosslinking agent or crosslinking agent mixture, preferably a polymeric crosslinking agent or crosslinking agent mixture comprising at least one polymeric crosslinking agent. The crosslinking agent, preferably polymeric crosslinking agent, is preferably present in the polymer composition or the extrudate of the lower film(s). According to a preferred embodiment, in the latter embodiment the extrudate of the lower film(s) is, furthermore, arranged above the upper film containing two or more different-colored extrudate substreams, so that the two or three extrudate substreams of the upper film, which have different colors or shades, are covered by the melt web or the extrudate web of the lower film(s). This produces a more rapid and/or better combination of the film webs, with the contours being retained. In the case of the embodiment using crosslinking agents, preferably polymeric crosslinking agents, these are added to the plastic mixture, preferably to the lower film(s) together with a chemical compound which is crosslinkable or partially crosslinkable, e.g. EPDM.

The polymer compositions of the upper and lower film preferably include at least one polyolefin or a polyolefin mixture and/or a styrene graft or block polymer and also, in the case of the lower film, at least one polymeric crosslinking agent as well.

According to a preferred embodiment, mass pressures of the different-colored extrudate streams (measured on exit from the extruder or coextruder) are identical or virtually identical and differ by less than 60 bar, preferably less than 45 bar, from one another, although the mass pressures of the different extrudate streams are higher than 250 bar, preferably higher than 280 bar, and/or the mass temperatures of the different-colored extrudate streams (measured on exit from the extruder) differ from one another by less than 30° C., preferably less than 15° C., with the mass temperature of the different-colored extrudate streams (measured on exit from the extruder) being set at more than 190° C., preferably more than 210° C.

The mass pressure of the different-colored extrudate streams (measured on exit from the extruder i.e., before the adapter or the black box) is preferably from 300 to 450 bar, more preferably from 340 to 440 bar, and the mass temperature (measured on exit from the extruder) is preferably from 200° to 250° C., more preferably from 220° to 245° C.

According to a preferred embodiment at least one crosslinking agent, preferably a polymeric crosslinking agent, is used for the polymer composition of the lower film(s) which is to be employed.

The polymeric crosslinking agent of the lower film or lower films, which contains reactive groups, in a preferred embodiment has not only acrylate and/or methacrylate groups and acrylic acid and/or methacrylic acid groups, and more than 51% by weight of ethylene and/or olefin or ($CH_2$) or CH groups, but also epoxide groups or epoxy-like groups, preferably glycidyl groups.

The polymers and/or ionomers of the lower film, which contain reactive groups, preferably include as a metal ion alkali metal ions and/or alkaline earth metal ions and/or zinc ions.

According to one embodiment, the polymers and/or ionomers which possess reactive groups, contain alkyl acrylates and/or alkyl methacrylates having 1 to 8 carbon atoms.

The two different-colored melts are consequently laid onto a backing melt by coextrusion, but are preferably covered by the melt of the lower film. Owing to the fact that these two melts do not become mixed on the way to the die and in the die, because of their virtually identical viscosity, and the fact that they are distributed uniformly over the width of the die, after having been separated beforehand in the adapter or in the black box, the distribution of the upper film or upper layer into respective colored areas is achieved.

The invention additionally provides a device for the production of two-colored or multicolored switchboard films, dashboard films or dashboards produced therefrom, which comprises at least two extruders, at least one adapter or one black box, at least three openings and/or supply connections for the supply of polymer melt from the respective extruder, and, downstream of the adapter, an extruder slot die (die block). In accordance with the invention, at least two of the openings made in the adapter are arranged on either side adjacent to a wedge-shaped projection or projection of triangular cross section, and at least one further inlet opening or an inlet slit for at least one lower layer is disposed below the openings which are arranged on the two sides. In this arrangement, it is preferable to employ three or more extruders.

According to a preferred embodiment, the tip of the wedge-shaped projection or projection of triangular cross section which is arranged above the gaps or the opening for the melt of the lower film(s) or lower layer(s) is directed toward the gap or melt opening for the lower film. According to one embodiment, the tip is directed at the darker-colored region F, so that a relatively wide surface layer region A and a relatively small surface region F (dark-colored) is established in the emerging film. According to a further preferred embodiment, the wedge-shaped projection in the adapter or in the black box is configured in the manner of a fillet or extended in the manner of a fillet. The wedge-shaped projection is preferably arranged on an element, molding or insert which can be inserted into or fastened in the adapter or in the black box, preferably on a disk.

According to another preferred embodiment the wedge-shaped projection or projection of triangular cross section forms, together with the gap or the melt opening for the lower film, an angle of less than 90° (for one color region) and an angle of more than 90° and less than 160°, preferably less than 150° (for the other color region).

The invention additionally provides switchboard films, dashboard films or dashboards produced therefrom, comprising at least one backing layer or backing film, at least one upper film or upper layer which is arranged thereon and contains dyes and/or color pigments, and also, if desired, one or more additional layers or films. According to the invention, the upper film or upper layer consists of at least two zones or sections which extend parallel or approximately parallel, are rectangular or parallelogrammic in plan view and are pigmented or colored differently, and the different-colored film(s) or upper layer(s) is or are produced as a composite film by coextrusion or multiextrusion together with at least one lower film or lower layer.

According to a preferred embodiment, the polymer composition for the upper and/or lower film comprises at least one propylene homopolymer, copolymer or graft polymer, propylene block copolymer or heterophase propylene block copolymer and/or EPM or EPDM or a crosslinked or partially crosslinked PP-EPDM, while the formulation of the lower film includes a polymeric crosslinking agent which has reactive groups, the formulations for the two-colored or multicolored upper films differing only in the additives, preferably in the dyes and/or color pigments, and/or, if appropriate, fillers.

It has been found that, for the novel process for producing two-colored or multicolored switchboard films, a highly suitable polymer formulation for the lower film is one comprising (based on 100 parts by weight of polymer of the film) up to 60% by weight of at least one partially crosslinked EPDM, from 12 to 30% by weight of propylene homopolymer, copolymer or graft polymer with or without reactive groups, from 77 to 9.5% by weight of at least one polymer and/or ionomer which contains reactive groups and is based on ethylene and methacrylic acid or acrylic acid, some of the acid groups containing metal ions or being neutralized by metal ions, and from 10 to 0.5% by weight of at least one polymeric crosslinking agent which contains reactive groups and of which more than 51% by weight (based on 100 parts by weight) comprises ethylene groups or other olefin groups and from 1 to 49% by weight comprises acrylate and/or methacrylate groups and reactive groups, the reactive groups being epoxide, isocyanate, ketone, aldehyde, silane, alkyl halide and/or anhydride groups, and also, if desired, at least one filler, additive, and/or processing auxiliary, or the polymer mixture consists thereof. In the context of the novel process, a particularly suitable composition for the two-colored or multicolored upper film is a polymer composition which comprises (based on 100 parts by weight of polymer of the upper film) from 20 to 80 parts by weight of at least one crosslinked PP-EPDM (alloy or mixture of propylene homopolymer and/or copolymer and crosslinked or partially crosslinked ethylene-propylene-diene copolymer) from 80 to 20 parts by weight of a noncrosslinked propylene block copolymer or heterophase propylene block polymer, having an elastomer fraction in the block or in the chain of from 35 to 75% by weight (based on 100 parts by weight of the non-crosslinked heterophase propylene block copolymer or propylene block polymer), from 15 to 1% by weight, preferably from 10 to 20% by weight, is replaced by the same amounts by weight of an ionomer and/or polymer containing reactive groups, where at least one ionomer and/or polymer which contains reactive groups and is based on ethylene and methacrylic acid and/or acrylic acid is present and some of the acid groups contain metal ions or are neutralized by metal ions, the upper and lower film comprising, if desired, fillers, additives and/or processing auxiliaries.

In this context the composition of the upper film preferably includes one or more dynamically crosslinked or partially crosslinked PP-EPDM or PP-EPDM mixtures or alloys. The constituents of the upper film are employed, if desired, in combination with processing auxiliaries, additives and/or fillers, but preferably with dyes and/or color pigments.

According to a preferred embodiment of the upper film, the melt index MFI (230/2.16) of the dynamically crosslinked or partially crosslinked PP-EPDM mixture (determined in accordance with DIN 53735) is below 12 g/10 min, preferably below 8 g/10 min, particularly preferably below 6 g/10 min. According to a preferred embodiment, in this case one of the constituents has a melt index MFI (230/2.16) of below 4.8 g/10 min, preferably below 2.5 g/10 min, particularly preferably below 1.8 g/10 min, while the other constituent of the PP-EPDM mixture has a higher MFI.

With particular preference, for the upper film, the polypropylene, or the homopolymer or copolymer fraction of the polypropylene, which is in the PP-EPDM mixture or is present therein in dispersed form, has a relatively low melt index. According to a preferred embodiment, the PP (polypropylene) or the homopolymer or copolymer fraction (PP) present in the mixture in dispersed form has a melt index MFI (230/2.16) of from 0.1 to 2 g/10 min, preferably from 0.3 to 1.5 g/10 min (determination method according to DIN 53735).

The polypropylene block of the noncrosslinked heterophase polypropylene block polymer preferably consists of a propylene homopolymer, copolymer and/or block polymer. The elastomer content of the heterophase polypropylene block copolymer, according to a preferred embodiment, is from 40 to 70% by weight (based on 100 parts by weight of the noncrosslinked heterophase propylene block copolymer). According to another preferred embodiment, however, the elastomer content of the heterophase propylene block copolymer is from 35.5 to 48% by weight, preferably from 36 to 45% by weight (based on 100 parts by weight of the noncrosslinked heterophase propylene block polymer).

According to a preferred embodiment, the elastomer of the ethylene-propylene copolymer has an ethylene content of 20 to 70% by weight, preferably 30 to 60% by weight, and a propylene content of 80 to 30% by weight, preferably 70 to 40% by weight, and has a molecular weight of more than 100,000, preferably more than 150,000.

The addition of a dynamically crosslinked PP-EPDM blend to the upper and/or lower film, with a particle size of the crosslinked elastomer phase of from 0.5 to 15 μm, improves the deformation range, the uniformity of thermal expansion and the grain pattern. An improved grain pattern means that the excessive expansion of the grain valleys as a result of the increase in strength which accompanies increasing extension is limited (strain hardening). To most advantageously achieve this effect there should be homogenous incorporation of the crosslinked PP-EPDM blend and a particulate elastomer structure. This gives rise to certain requirements regarding the degree of crosslinking and the melt index of the crosslinked PP-EPDM blend used. The degree of crosslinking in the complex systems, defined indirectly via the compression set at 70° C. after 22 h (DIN 53517), should be between 25 and 60.

The heterophase propylene block polymer used is preferably a block polymer having an MFI 230/2.16 (g/10 min) of 0.3 to 8, preferably from 0.5 to 7.

The PP-EPDM, preferably dynamically crosslinked or partially crosslinked PP-EPDM, used for the upper and/or lower film(s) is preferably that with a density of between 0.78 and 0.96 g/cm$^3$, preferably from 0.83 to 0.93 g/cm$^3$. The PP-EPDM selected for this purpose preferably has an initial flexural modulus—measured in accordance with ASTM D 790 with a 2 mm film web—of from 80 to 400 MPa, preferably from 100 to 300 MPa.

According to a preferred embodiment the lower film or lower films (based on 100 parts by weight of polymer of the lower film or lower films) comprises from 5 to 55% by weight of at least one partially crosslinked EPDM, from 13 to 25% by weight of propylene homopolymer, copolymer or graft polymer with or without reactive groups, from 73 to 19% by weight of at least one ionomer and/or polymer which contains reactive groups and is based on ethylene and methacrylic acid or acrylic acid, some of the acid groups containing metal ions or being neutralized by metal ions, and from 9 to 1% by weight of at least one polymeric crosslinking agent which contains reactive groups and more than 51% by weight (based on 100 parts by weight) of ethylene groups or other olefin groups and from 1 to 49% by weight of acrylate and/or methacrylate groups and reactive groups, the reactive groups being, epoxide, isocyanate, ketone, aldehyde, silane, alkyl halide and/or anhydride groups, or the lower film(s) contain(s) these constituents.

The novel thermoformable composite films possess a degree of gloss in accordance with DIN 57530/600 of from 0.5 to 5 of the upper film, which is substantially influenced neither by the necessary deformation temperature nor by the thermoforming ratio. This feature, therefore, distinguishes the novel films from the knowledge gained from previous experience with films which have been rendered matt by means of fillers or embossing.

Using the novel additive and/or the novel mixture for the production of thermoformable automotive films it is possible to obtain polymer films with a matt surface and with high elasticity for the thermoforming operation. In this context, the thermoforming of the novel composite film can be carried out within a broad temperature range from about 140° to 200° C., preferably from 150° to 185° C., without any particular problems. The film has excellent thermoforming properties and can be employed either in positive thermoforming or in negative thermoforming. Using the composition it is possible to obtain thermoformed films having a Shore D hardness from 25 to 60, preferably from 30 to 55, and a Gardner gloss at 60° of from 0.5 to 1.5, measured on the thermoformed article.

The novel automotive composite film webs for interior trim have the advantage, moreover, of high ageing stability with respect to light and heat, and also low fog values.

According to a preferred embodiment, the upper film and/or lower film has a filler content of 0 to 30 parts by weight, preferably from 0 to 20 parts by weight (based on 100 parts by weight polymer). Fillers which can be employed are the fillers known per se, preferably talc and/or SiO$_2$ having a mean particle size of from 0.01 to 20 μm preferably from 0.05 to 10 μm.

Processing auxiliaries employed include, preferably, heat stabilizers and/or light stabilizers for polyolefins.

Further processing auxiliaries or additives used include lubricants or mixtures of lubricants.

According to one embodiment, an adhesion promoter layer is preferably arranged below the film layer. The adhesion promoter layer preferably comprises or consists of acrylates, polyurethane or acrylate polyurethane mixtures. Below the film layer or adhesion promoter layer there is preferably a foam layer, a backing layer, a fabric layer and/or a support layer. The foam layer preferably comprises or consists of a polyolefin foam or polyurethane foam.

The upper film preferably has a mean thickness of from 60 to 500 μm, more preferably from 100 to 350 μm. The lower film or lower films possess an average thickness of from 100 to 2000 μm, preferably from 500 to 1500 μm, and have an overall thickness which is more than 1.5 times, preferably two or more times, that of the upper film.

The novel composite film can be thermoformed very readily and is used to produce low-strain articles with precise reproduction of dimensionally or temperature-stable surface structural features. The composite film is preferably machined or processed in the positive thermoforming process and/or negative thermoforming process. On the bottom side or bottom surface the composite material preferably has a foam layer, for example, polyurethane foam, but preferably polyolefin foam, and/or is provided with a backing layer or a backing and/or a support layer and/or a lattice or fabric layer. The film or layer is provided in accordance with a preferred embodiment with decorative features, grains, embossed patterns and the like, has a stable grain, is pleasant to touch and can be printed. Using the novel composite film it is possible to produce shaped components or articles whose surface has good grain stability even on storage under hot conditions.

In this context, according to a preferred embodiment, the backing layer and/or foam layer contains polyolefins or is based on polyolefins.

The polymeric crosslinking agent of the lower film or lower films, which contains reactive groups, in a preferred embodiment has not only acrylate and/or methacrylate groups and acrylic and/or methacrylic acid groups, and more than 51% by weight of ethylene and/or olefin or ($CH_2$) or CH groups, but also epoxide groups or epoxy-like groups, preferably glycidyl groups.

The reactive-group-containing polymers and/or ionomers of the lower film preferably include, as the metal ion, alkali metal ions and/or alkaline earth metal ions and/or zinc ions.

According to one embodiment, the ionomers and/or polymers which possess reactive groups contain alkyl acrylates and/or alkyl methacrylates having 1 to 8 carbon atoms.

According to a preferred embodiment of the invention the upper film has or is adjusted to a Shore D hardness which is less by more than 3 Shore D units, preferably from 5 to 10 Shore D units, than the Shore D hardness of the lower film(s), and/or the surface tension of the upper film is adjusted to a value of more than 40 mN/m.

By appropriately selecting the weight of the constituents of the upper film, and preferably of the constituents within the stated amounts by weight of the constituent, the Shore D hardness of the upper film is preferably adjusted to a Shore D hardness of less than 37, more preferably to a Shore D hardness of from 28 to 35, and/or, by appropriately selecting the weight of the constituents of the lower film(s), preferably of the constituents within the stated amounts by weight, the Shore D hardness of the lower film(s) is preferably adjusted to at least 38 Shore D, more preferably from 39 to 48 Shore D.

According to another preferred embodiment, at least one polyacrylate-, polymethacrylate- and/or polyurethane-containing layer is arranged above the upper film or on the film surface and/or below the lower film, the thickness of said layer being less than that of the upper film or lower film, and in this context the layer thickness of the coating preferably being less than 50% of the layer thickness of the upper and lower film(s).

In this arrangement, the upper film, and, if desired, areas of the lower film(s) are preferably embossed or grained and the surface is provided with a polyacrylate-, polymethacrylate- and/or polyurethane-containing layer or coating which includes from 0.01 to 18% by weight, preferably from 0.1 to 12% by weight, of at least one finely divided matting agent and is coated by applying a diluent.

According to a further embodiment, the polymer composition of the lower film includes, as synthetic resin, from 65% by weight to 90% by weight (based on 100% by weight plastics fraction of the lower film) of propylene homopolymer, copolymer, terpolymer and/or block polymer and from 35 to 10% by weight of ethylene-vinylacetate copolymer having a vinyl acetate content of from 10 to 40% by weight, and also, if desired, from 0.1 to 5.0% by weight of a crosslinking agent, preferably a polymeric crosslinking agent, or of at least one peroxide or compound containing peroxide groups.

According to another embodiment, the polymer composition of the lower film includes at least one partially crosslinked EPDM, a propylene homopolymer, copolymer or graft polymer, with or without reactive groups, and also, if desired, an ionomer or polymer containing reactive groups or a styrene- or polystyrene-containing block, diblock or triblock and/or graft polymer which is replaced in whole or in part by a modifying agent based on a propylene-maleic anhydride copolymer or graft polymer, a propylene-acrylic acid copolymer or graft polymer, an ethylene-vinylacetate copolymer, an ethylene-acrylic acid or methacrylic acid copolymer, an ethylene-acrylic acid copolymer, an ethylene-acrylate copolymer, a glycidyl methacrylate co- and/or terpolymer, preferably an olefinic or olefin group- containing glycidyl methacrylate co- and/or terpolymer, an ethylene-glycidyl methacrylate terpolymer, an olefinic ionomer, a polyurethane, a polycaprolactone, a polyester ether and/or a polyetheramide.

The constituents of the lower film are preferably selected such that the lower film produced therefrom (based on the initial or final cross section of the lower film) has a maximum stress-strain in the range from $30 \times 10^2$ to $150 \times 10^2$ (these values being determined at a constant deformation rate at 170° C.) and/or such that the stress-strain curve, after reaching the maximum, runs approximately parallel to the extension axis in the case of extension of more than 150%, preferably more than 300% extension, and/or there are only small differences in viscosity of the two-colored or multi-colored upper film at the respective processing temperatures.

According to another embodiment, the formulation of the two-colored or multicolored upper film comprises or consists of, as polymer component or polymer mixture, (x) from 5 to 80 parts by weight of at least one elastic polymer which contains reactive groups or of at least one thermoplastic elastomer which contains reactive groups or a polymer or polymer mixture which contains reactive groups and has a portion of elastic polymer of more than 60% by weight (based on 100 parts by weight of the elastomer-containing polymer or polymer mixture), and (y) from 95 to 20 parts by weight of at least one olefin copolymer, terpolymer and/or graft polymer which contains reactive groups and/or of an ionomer which contains or is based on a polyolefin homopolymer, copolymer, terpolymer and/or graft polymer, the modulus of elasticity of the mixture of (x) and (y) or the modulus of elasticity of the thermoformed polymer film or polymer film web produced therefrom or of the layer being preferably from 30 to 1000 $N/mm^2$, more preferably between 50 and 600 $N/mm^2$, the reactive groups being carboxyl, hydroxyl, anhydride, amine, amide, isocyanate, epoxy and/or nitro groups, and/or the viscosity being established such that there are only small differences in viscosity at the respective processing temperature relative to the lower film.

According to one embodiment, the proportion by weight is from 0.2 to 30% by weight, preferably from 0.3 to 25% by weight, based on, the elastic polymer(s) containing reactive groups (calculated at 100 parts by weight) or thermoplastic elastomer(s) or polymer mixture(s) containing reactive groups in accordance with (x), and from 0.2 to 25% by weight, preferably from 0.5 to 20% by weight, based on the polyolefin(s) containing reactive groups or polyolefin-containing ionomer(s) (according to (y)).

The drawings show, in diagram form, embodiments of the novel process using the novel apparatus.

In FIG. 1 the extruder (1) is combined with or provided with coextrusion devices (2) and (3), the black box (4) and the slot die (5).

In the simple embodiment according to FIG. 1, the multilayer composite film passes to the polishing rolls (6) and (7) (with or without embossing structure) and to the other polishing roll (7').

According to the preferred embodiment in FIG. 1, the wedge-shaped projection (8) or projection (8) of triangular cross section is shown in diagram form in the adapter or black box. The projection (8) is arranged on the insert (9).

FIG. 2 represents a plan view of the insert which is to be inserted in or fastened to the adapter or the black box. In FIG. 2, two of the circular openings 12 made in the adapter are arranged on either side of and adjacent to a wedge-shaped projection or projection of triangular cross section 8, and at least one further entry opening or an entry slot 14 is made for at least one lower layer below the opening which is disposed on both sides.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. An apparatus for the production of two-colored or multicolored films, suitable for producing dashboards comprising:

at least two extruders;

at least one adapter having at least three openings at least two of which are for receiving a supply of polymer melt from a respective extruder;

and downstream of the adapter, an extruder slot die, wherein at least two of the openings made in the adapter are arranged on either side adjacent to a projection of triangular cross section, and at least one further opening is an inlet opening for at least one backing layer and is disposed on the opposite side of the projection from the openings which are arranged on the two sides of the projection.

2. The device as claimed in claim 1, wherein a tip of the projection of triangular cross section is directed toward the inlet opening for the backing layer.

3. The apparatus as claimed in claim 1, wherein the projection is arranged on an insert which can be inserted into the adapter, where the respective insert and the projection comprise a rigid material that does not deform under the influence of polymer mass streams.

4. The apparatus as claimed in claim 1, wherein the projection of triangular cross section forms, together with the opening for the backing layer, an angle of less than 90° for one color region, and an angle of more than 90° and less than 160° for the other color region.

5. The apparatus as claimed in claims 1, further comprising a polishing-roll stack having at least two rolls positioned downstream of the extruder slot die.

6. An apparatus for the production of two-colored or multicolored films, suitable for producing dashboards comprising:

at least two extruders;

at least one adapter having at least three openings at least two of which are for receiving a supply of polymer melt from a respective extruder;

and downstream of the adapter, an extruder slot die, wherein at least two of the openings made in the adapter are arranged on either side adjacent to a projection of triangular cross section, and at least one further opening is an inlet opening for at least one backing layer and is disposed on the opposite side of the projection from the openings which are arranged on the two sides of the projection, wherein a tip of said projection of triangular cross section is directed toward the inlet opening for the backing layer.

* * * * *